United States Patent [19]

Gaddis

[11] Patent Number: 4,776,451
[45] Date of Patent: Oct. 11, 1988

[54] CONVEYOR SYSTEM FOR PARTICULATE MATERIAL

[76] Inventor: Donald L. Gaddis, Rte. #4, Solon, Iowa 52333

[21] Appl. No.: 911,722

[22] Filed: Sep. 26, 1986

[51] Int. Cl.[4] .............................................. B65G 15/14
[52] U.S. Cl. ................................................... 198/627
[58] Field of Search .................... 198/627, 626, 860.3, 198/861.1, 311, 320, 841

[56] References Cited

U.S. PATENT DOCUMENTS

| | | | |
|---|---|---|---|
| 2,332,672 | 10/1943 | Schmitt | 198/627 X |
| 2,709,000 | 5/1955 | Frank et al. | 198/627 X |
| 2,812,052 | 11/1957 | Doyer | 198/626 |
| 2,916,138 | 12/1959 | Hume . | |
| 2,987,166 | 6/1961 | Gray . | |
| 3,124,231 | 3/1964 | Ott, Jr. . | |
| 3,132,754 | 5/1964 | Smoker et al. | 198/626 X |
| 3,138,120 | 6/1964 | Balmer et al. . | |
| 3,161,278 | 12/1964 | Buccione . | |
| 3,170,564 | 2/1965 | Gatto | 198/627 |
| 3,581,876 | 6/1971 | Keith | 198/627 |
| 3,605,295 | 9/1971 | Walenski | 474/92 |
| 3,910,405 | 10/1975 | Couperus et al. | 198/163 |
| 3,948,383 | 4/1976 | Janitsch et al. | 198/165 |
| 4,000,805 | 1/1977 | Hadler | 198/320 |
| 4,389,156 | 11/1982 | Austin | 198/841 |
| 4,457,422 | 7/1984 | Hurd | 198/604 |
| 4,566,586 | 1/1986 | Robertson | 198/628 |
| 4,585,432 | 4/1986 | Marysse | 198/627 X |
| 4,618,136 | 10/1986 | Pessina et al. | 198/627 X |

FOREIGN PATENT DOCUMENTS

| | | | |
|---|---|---|---|
| 0037879 | 10/1981 | European Pat. Off. | 198/626 |
| 511792 | 4/1953 | Italy | 198/626 |
| 619394 | 8/1978 | U.S.S.R. | 198/626 |

*Primary Examiner*—Kenneth J. Dorner
*Assistant Examiner*—José V. Chen
*Attorney, Agent, or Firm*—Zarley, McKee, Thomte, Voorhees & Sease

[57] ABSTRACT

A dual conveyor system is provided for conveying particulate material. The system includes a frame with an upper and lower conveyor housed therein. The lower track of the upper conveyor is closely spaced to the upper track of the lower conveyor so as to define a passageway therebetween through which the material is conveyed. A single motor drives both conveyors. The lower conveyor extends beyond the upper conveyor at both the inlet and outlet ends of the system so that material can be deposited and discharged without interference by the upper conveyor. A plurality of stationary hold-down bars are mounted on the frame between the upper and lower tracks of the upper conveyor and are slidably frictionally engaged by such lower track so as to prevent the lower track of the upper conveyor from being moved apart from the upper track of the lower conveyor by the material being conveyed therebetween. The depth of the passageway between the lower track of the upper conveyor and the upper track of the lower conveyor is adjustable so that the volume of material conveyed therein can be controlled. An adjustable support frame supports the upper and lower conveyors and allows the elevation of the outlet end of the passageway to be adjusted with respect to the inlet end of the passageway.

9 Claims, 2 Drawing Sheets

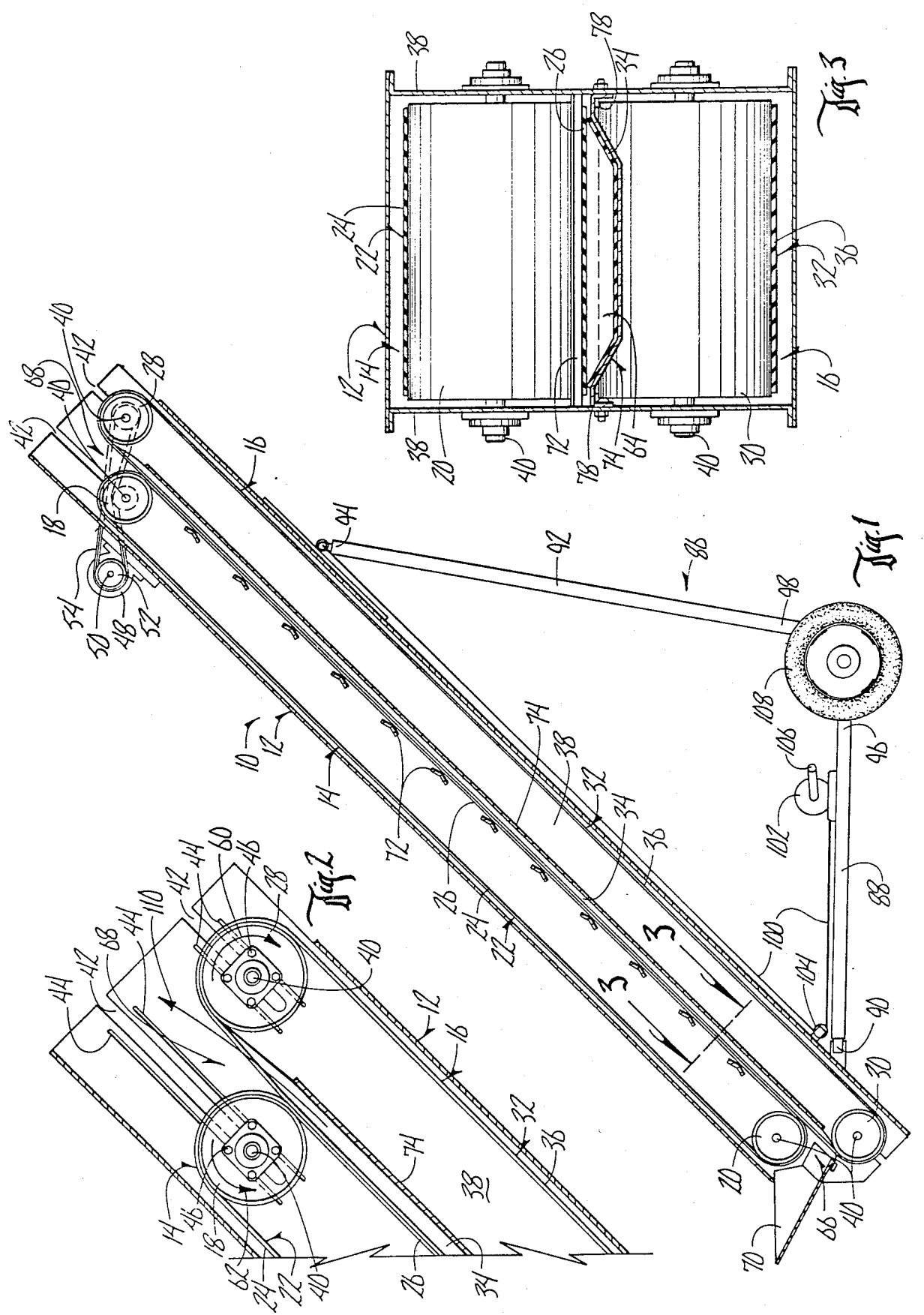

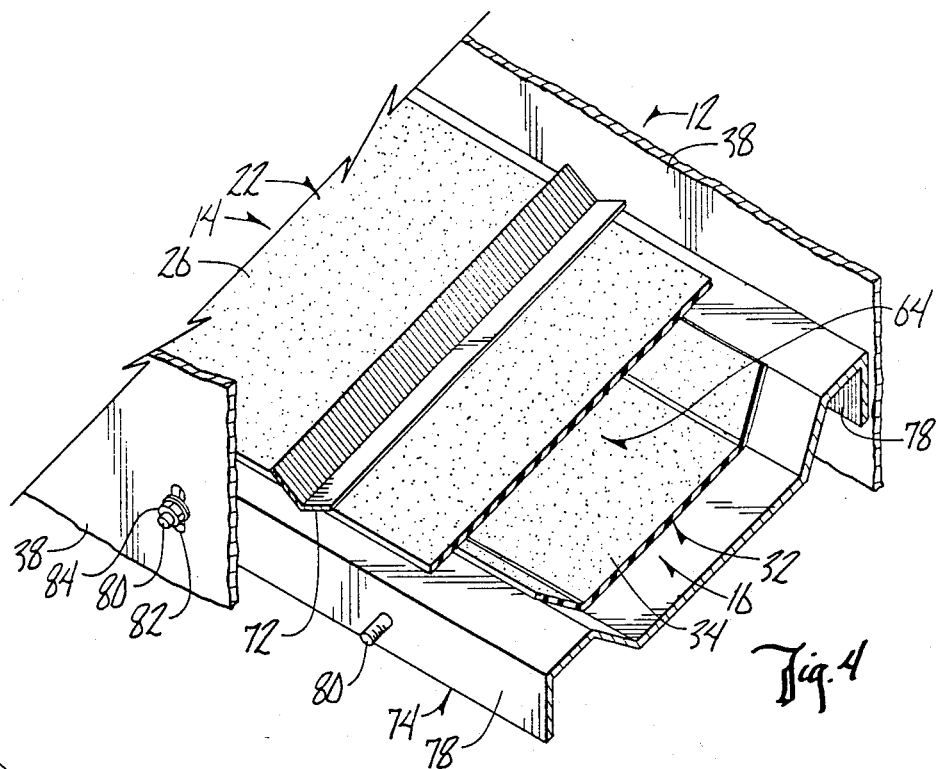
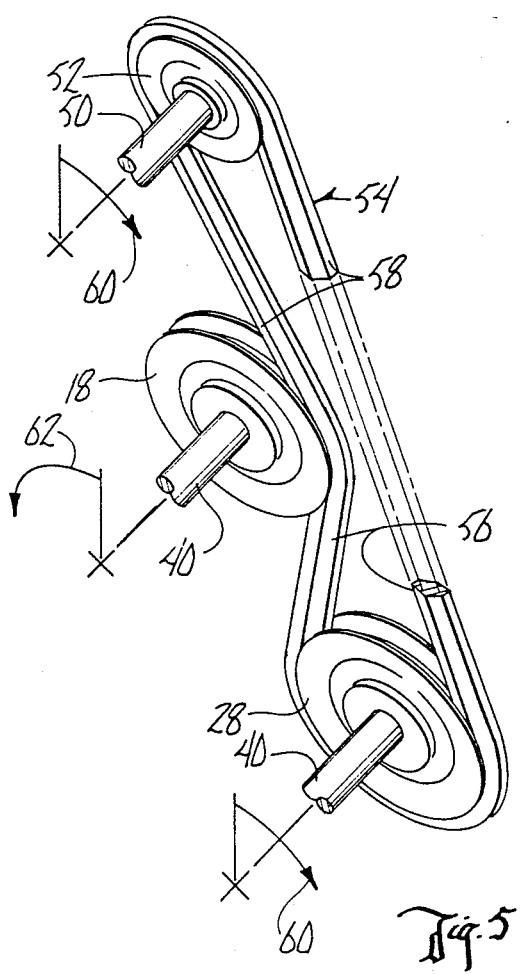

CONVEYOR SYSTEM FOR PARTICULATE MATERIAL

BACKGROUND OF THE INVENTION

Dual parallel conveyors are well known for conveying materials between the adjacent tracks of the two conveyors. However, these prior art dual conveyor systems have several shortcomings. First, these conveyors are not intended for use at high operational speeds such that the material is thrown from the outlet of the conveyor system, but rather are intended for operation at slow speeds such that the object or material being carried thereby is slowly discharged from the outlet end of the system. Furthermore, separate motors have been utilized to drive the two conveyors, thereby adding to the construction and operating costs of the system. Furthermore, in the past, the spacing between the adjacent tracks of the two conveyors has not been selectively adjustable so as to accommodate different volumes and sizes of material. Rather, the belts of the conveyors have merely remained flexible to accommodate various sizes of objects being transported thereby. Furthermore, such dual conveyor systems generally are not portable and not height adjustable so that materials or objects can be discharged at various heights.

Accordingly, a primary objective of the present invention is the provision of an improved dual conveyor system for conveying particulate material.

Another objective of the present invention is the provision of a conveyor system which does not interfere with the discharge of the material from the outlet end of the conveyor system.

A further objective of the present invention is the provision of a dual conveyor system which can be operated at high speeds such that the particulate material is thrown from the outlet end of the system to a desired location.

Another objective of the present invention is the provision of a conveyor system having dual conveyors which are driven by a single motor.

Still a further objective of the present invention is the provision of a dual conveyor system wherein the spacing between the adjacent tracks of the conveyors is adjustable.

Another objective of the present invention is the provision of a conveyor system wherein the height of the outlet end of the system relative to the inlet end of the system can be easily adjusted.

Still another objective of the present invention is the provision of a dual conveyor system for particulate material which is lightweight and portable, and which is durable, efficient, and safe.

These and other objectives will become apparent from the following description of the present invention.

BRIEF DESCRIPTION OF THE DRAWINGS

FIG. 1 is a sectional side elevation view of the conveyor system of the present invention.

FIG. 2 is a partial sectional side elevation view of the outlet end of the conveyor system of the present invention.

FIG. 3 is a sectional view taken along lines 3—3 of FIG. 1.

FIG. 4 is a partial cutaway perspective view showing the adjacent tracks of the conveyors of the present invention.

FIG. 5 is a perspective view of the pulley system used to drive the conveyors of the present invention.

DETAILED DESCRIPTION OF THE PREFERRED EMBODIMENT

The conveyor system of the present invention is generally designated by the reference numeral 10 in the drawings. The system includes a frame 12 for supporting and housing an upper conveyor 14 and a lower conveyor 16.

Upper conveyor 14 includes a drive pulley 18, a spaced apart idler pulley 20, and an endless loop belt 22 trained about pulleys 18 and 20 so as to define an upper track 24 and a lower track 26. Similarly, lower conveyor 16 includes a drive pulley 28, a spaced apart idler pulley 30, and an endless loop belt 32 trained about pulleys 28 and 30 so as to define an upper track 34 and a lower track 36. While belts 22 and 32 are shown to be smooth, these belts may be textured to facilitate the movement of particulate material therebetween, as described hereinafter.

Housing frame 12 includes opposite side walls 38 which rotatably support a plurality of pulley shafts 40 extending through pulleys 18, 20, 28, and 30. As seen in FIG. 2, the upper end of frame 12 has a pair of slots 42 in side walls 38 of frame 12 along which shafts 40 of pulleys 18 and 28 can slide so as to adjust the tension in belts 22 and 32. Additional slots 44 receive bolts 46 which can be tightened to maintain pulleys 18 and 28 in position along slots 42 and thereby maintain the tension of the belts 22 and 32 at the desired level.

A motor 48 is mounted on frame 12 and includes a drive shaft 50 with a pulley 52 mounted thereon. A drive belt 54 drivingly engages motor pulley 52 and drive pulleys 18 and 28, as best seen in FIG. 5. Drive belt 54 includes an inner drive surface 56 which partially encircles motor pulley 52 and drive pulley 28 and an outer drive surface 58 which partially encircles drive pulley 18. Thus, upon actuation of motor 48, pulleys 52 and 28 rotate in one direction as indicated by arrows 60 in FIG. 5, while pulley 18 rotates in the opposite direction as indicated by arrow 62 in FIG. 5. Thus, lower track 26 of upper conveyor 14 and upper track 34 of lower conveyor 16 move together in the same direction.

Lower track 26 of upper conveyor 14 and upper track 34 of lower conveyor 16 are spaced closely together so as to define a passageway 64 therebetween for carrying particulate material. The passageway has an inlet end 66 and an outlet end 68. A hopper 70 may be provided adjacent the inlet end 66. As seen in FIG. 1, lower conveyor 16 is longer than upper conveyor 14 and the opposite ends of conveyor 16 extend beyond the opposite ends of conveyor 14. Thus, at inlet end 66, material can be easily dropped onto upper track 34 of the lower conveoyr 16, and carried thereby into the passageway. Furthermore, conveyor 14 does not deflect the material downwardly as it is discharged from outlet end 68.

A plurality of stationary hold-down bars 72 extend between and are attached to side walls 38 of frame 12. Bars 72 engage lower track 26 of upper conveyor 14 so as to prevent the track from being pushed away from upper track 34 of lower conveyor 16 when material is being carried through passageway 64. Bars 72 are shown to be V-shaped so that there is a minimum line of contact between the bars and lower track 26. Bars 72 may take other shapes which would provide similar minimal contact with lower track 26, such as a cylindrical rod.

A channel bracket 74 is positioned beneath upper track 34 of lower conveyor 16 and extends substantially along the length thereof. Channel bracket 74 has an upwardly presented concave surface which supports upper track 34 when material is carried thereon. As seen in FIG. 3, upper track 34 tends to take the shape of the concave surface of channel bracket 74 so as to provide depth to passageway 64. Channel bracket 74 includes a pair of flanges 78 on either side, with each flange having a plurality of threaded studs 80 extending outwardly therefrom, as best seen in FIG. 4. Studs 80 extend through an elongated slot 82 in the respective side walls 38 of frame 12 and receive a bolt 84 for securing channel bracket 74 to the side wall. Slots 82 permit bracket 74 to be raised or lowered so as to adjust the depth of passageway 64. Thus, the volume of material carried in passageway 64 at any particular time can be controlled by adjusting the position of channel bracket 74 and thereby the spacing between lower track 26 of upper conveyor 14 and upper track 34 of lower conveyor 16.

System 10 also includes a support frame 86 for supporting conveyors 14 and 16. Support frame 86 includes a first support member 88 having a first end 90 pivotally secured to housing frame 12 adjacent inlet end 66. Support frame 86 also includes a second support member 92 having a first end 94 slidably connected to housing frame 12 in a convenient manner at a point spaced apart from first end 90 of first support member 88. Second end 96 of first support member 88 is pivotally secured to the second end 98 of second support member 92. A cable 100 is secured at opposite ends to first end 94 of second support member 92 and a winch 102 mounted on first support member 88. Cable 102 extends around a pulley 104 mounted on housing 12 intermediate its opposite ends.

A handle 106 on winch 102 can be turned in one direction to wind cable 100 around winch 102 and thereby slide first end 94 of second support member 92 downwardly along housing frame 12 so as to raise outlet end 68 with respect to inlet end 66. When handle 106 is turned in the opposite direction, cable 100 is unwound from winch 102 and the weight of conveyors 14 and 16 causes first end 94 of second support member 92 to slide upwardly along housing frame 12 and thereby lower outlet end 68 with respect to inlet end 66. Thus, adjustable support frame 86 allows the elevation of outlet end 68 to be easily changed as desired. A pair of wheels 108 (only one is shown) is provided on support frame 86 such that system 10 is portable from one location to another.

System 10 is operable at high speeds, with belts 22 and 32 traveling at velocities up to 6000 feet per minute. In comparison, prior art dual conveyors are typically operated at speeds of approximately 600 feet per minute. With the high speed of the present system, the material conveyed through the passageway can be thrown a considerable distance from outlet end 68. For example, grain can be shot from passageway 64 to a storage bin or pile. The operational speed of the system and the depth of passageway 64 determine the distance the material can be thrown from outlet end 68. The distance increases as the speed increases and the distance decreases as the speed decreases. Also, as the depth of passageway 64 increases, the distance decreases, while the distance increases as the depth of passageway 64 decreases. The elevation of outlet end 68 with respect to inlet end 66 also affects the distance which the material can be thrown from passageway 64.

Since lower conveyor 16 extends beyond upper conveyor 14 at outlet end 68 of passageway 64, the material will be ejected from passageway 64 without being deflected downwardly by lower track 26 of upper conveyor 14. Furthermore, as seen in FIGS. 2 and 3, the distance between the concave surface of channel bracket 74 and lower track 36 of lower conveyor 14 is less than the diameter of drive pulley 28 such that upper track 34 of lower conveyor 16 expands slightly between the outer end of channel bracket 74 and drive pulley 28, thereby providing a slight lift to the discharged material, as indicated by arrow 110 in FIG. 2.

Due to the high operational speeds of system 10, it is preferred that the drive train of the system, including motor 48 and drive pulleys 18, 28 and 52, be mounted adjacent the outlet end of the system so that lower track 26 of upper conveyor 14 and upper track 34 of lower conveyor 16 are "pulled" by their respective drive pulleys 18 and 28, rather than being "pushed" by the drive pulleys, as are upper track 24 of lower conveyor 14 and lower track 36 of upper conveyor 16. The increased operational speed of the present invention requires the use of stationary hold-down bars 72 rather than conventional rollers which cannot withstand such high speeds. The sliding frictional engagement of lower track 26 with holddown bars 72 is minimized due to the line contact between the track and the bars.

From the foregoing, it can be seen that the present invention accomplishes at least all of the stated objectives.

What is claimed is:

1. A conveyor system for conveying particulate material, comprising:
   a frame;
   an upper conveyor and a lower conveyor operatively mounted on said frame;
   each of said upper and lower conveyors including a drive pulley, a spaced apart idler pulley, and an endless loop belt trained about said pulleys so as to define upper and lower tracks;
   said upper track of said lower conveyor being closely spaced to said lower track of said upper conveyor so as to define an elongated passageway therebetween for conveying particulate material, said passageway having an inlet end and an outlet end;
   drive means for driving said drive pulleys whereby said belts move around the respective drive and idler pulleys so as to carry material in said passageway from said inlet end to said outlet end; and
   a plurality of stationary non-rotating bars mounted on said frame between said upper and lower tracks of said upper conveyor and spaced apart substantially along the length of said passageway for sliding frictional engagement by said lower track, thereby preventing said lower track of said upper conveyor from being moved away from said upper track of said lower conveyor by said material as said material is carried in said passageway.

2. The system of claim 1 wherein said drive pulleys are positioned adjacent said outlet end of said passageway and said idler pulleys are positioned adjacent said inlet end of said passageway.

3. The system of claim 1 wherein said lower conveyor extends beyond said upper conveyor at said inlet end of said passagewy such that material can be deposited on said lower conveyor and carried into said passageway.

4. The system of claim 1 wherein said bars extend substantially across the width of said lower track of said upper conveyor, each bar having linear contact with said lower track.

5. The system of claim 1 wherein said drive means includes a single motor having a drive shaft with a pulley mounted thereon, and a single endless loop drivingly engaging said motor pulley and said drive pulleys of said conveyors whereby actuation of said motor imparts rotation to said drive pulleys in opposite directions; said endless loop having an internal drive surface engaging said motor pulley and one of said drive pulleys and an opposite external drive surface engaging the other of said drive pulleys.

6. The system of claim 1 further comprising adjustable support means for supporting said upper and lower conveyors and for adjusting the elevation of said outlet end of said passageway relative to said inlet end thereof; said support means includes a first enlongated support member having a first end pivotally attached to said frame and a second end, a second elongated support member having a first end slidably attached to said frame at a location spaced apart from the attachment of said first support member, said second ends of said first and second support members being pivotally connected to one another, and means for pivoting said first and second support members relative to one another whereby the first end of said second support member slides along said frame so as to raise or lower said outlet end of said passageway relative to said inlet end of said passageway.

7. The system of claim 6 wherein said means for pivoting said support members includes a winch mounted on said system at a location remote from said first end of said second support member and a cable secured at opposite ends to said first end of said second support member and to said winch whereby actuation of said winch slides said first end of said second support member along said frame and thereby pivot said support members relative to one another so as to adjust the elevation of said outlet end of said passageway.

8. The system of claim 4 wherein said frame includes slots means for slidably mounting one of said drive pulley or said idler pulley for each conveyor such that the tension of each conveyor can be adjusted.

9. A conveyor system for conveying particulate material, comprising:
a frame;
an upper conveyor and a lower conveyor operatively mounted on said frame;
each of said upper and lower conveyors including a drive pulley, a spaced apart idler pulley, and an endless loop belt trained about said pulleys so as to define upper and lower tracks;
said upper track of said lower conveyor being closely spaced to said lower track of said upper conveyor so as to define a passageway therebetween for conveying particulate material, said passageway having an inlet end and an outlet end and an adjustable volume;
drive means for driving said drive pulleys whereby said belts move around the respective drive and idler pulleys so as to carry material in said passageway from said inlet end to said outlet end;
spacing means for adjusting the spacing between said lower track of said upper conveyor and said upper track of said lower conveyor whereby the volume of said passageway is adjustable;
said spacing means including a support plate slidably connected to said frame, said plate being positioned between said upper and lower tracks of said lower conveyor so as to supportively engage said upper track of said lower conveyor for sliding movement along said support plate, and fastening means for adjustably securing said plate to said frame and thereby maintain said upper track of said lower conveyor is selected spaced relation to said lower track of said upper conveyor; and
said plate extending across the width of said upper track of said lower conveyor and including an upwardly presented concave surface between the the opposite edges thereof, said upper track of said lower conveyor substantially assuming the shape of said concave surface for carrying material along said passageway.

* * * * *